United States Patent [19]
Sato et al.

[11] Patent Number: 5,562,258
[45] Date of Patent: Oct. 8, 1996

[54] BELT DRIVEN CARTRIDGE FOR GUIDING TAPE WITH REDUCED OFFTRACKING

[75] Inventors: Masanori Sato; Osamu Koizumi, both of Miyagi, Japan

[73] Assignee: Sony Corporation, Tokyo, Japan

[21] Appl. No.: 328,018

[22] Filed: Oct. 24, 1994

[30] Foreign Application Priority Data

Oct. 29, 1993 [JP] Japan .................................. 5-271977

[51] Int. Cl.⁶ .......................... G11B 23/087; G11B 23/04
[52] U.S. Cl. .......................... 242/346; 242/342; 360/132
[58] Field of Search .............................. 242/346, 615.3, 242/342; 360/132, 130.21

[56] References Cited

U.S. PATENT DOCUMENTS

| | | | |
|---|---|---|---|
| 3,229,045 | 1/1966 | Bakos | 360/130.21 |
| 3,756,610 | 9/1973 | Naegele et al. | 360/130.21 |
| 4,231,532 | 11/1980 | Popov et al. | 242/346 |
| 4,534,523 | 8/1985 | Zarr | 242/346 |
| 5,104,058 | 4/1992 | Eggebeen | 242/346 |
| 5,287,240 | 2/1994 | Koizumi et al. | 360/132 |
| 5,414,585 | 5/1995 | Saliba | 360/130.21 |

*Primary Examiner*—John Q. Nguyen

[57] ABSTRACT

A tape cartridge for housing magnetic tape includes first and second tape guide portions including upper and lower flanges provided thereon for guiding tape along a predetermined tape path according to rotation of supply and take-up reels of the tape cartridge. The tape is disposed such that an upper edge thereof contacts an inner side of an upper flange of the first tape guide and an inner side of the lower flange of the second tape guide. A width dimension between these two inner sides of the flanges being substantially equal to the width of the tape. This may be effected by mounting the first and second tape guide portions at different heights on a base plate of the cartridge. According to this, it is possible to substantially reduce 'offtracking' of tape running in said cartridge.

6 Claims, 7 Drawing Sheets

BELT DRIVEN CARTRIDGE FOR GUIDING TAPE WITH REDUCED OFFTRACKING

BACKGROUND OF THE INVENTION

1. Field of the Invention

The present invention relates generally to a cassette type tape cartridge. Specifically, the present invention relates to a tape cartridge for magnetic tape, particularly as utilized in computer tape drive applications, for providing improved guide characteristics during tape running.

2. Description of the Related Art

External tape drives are commonly available as a computer peripheral device allowing relatively low-cost, high-volume memory storage capacity to computer users. A variety of such tape drives have been proposed including, 8 mm cassette tape drives, DAT drives, ¼ inch tape drives etc. It is necessary in such data storage applications that tape motion be precisely controlled for prevention of errors during data storage or playback due to so-called 'off track' variation wherein the tape position varies laterally while in motion. According to such tracking error, even slight variation may degrade the overall performance of the tape drive.

Referring now to FIGS. 9 and 10, a tape guide portion of a conventional tape cartridge such as disclosed in U.S. Pat. No. 5,097,374 will be discussed hereinbelow for providing background information in connection with tile related art.

As may be seen in these drawings, the conventional cartridge 101 includes a magnetic head insertion portion 102 flanked on left and right sides thereof by first and second tape guide members 104, 105 provided on an upper side of a base plate 103 of the tape cartridge.

The magnetic tape 106 of the tape cartridge is guided around each of the guide members 104, 105 from the supply and take-up reels 109, 110.

Referring now to FIG. 10, it may be seen that each of the guide member 104, 105 respectively includes an upper flange 107 and a lower flange 108. It will be noted that each flange includes a positional regulating surface portion 107a, 108a thereof on an inner side of the flange 107, 108 such that a flange width FW from the surfaces of the positional regulating portions 107a, 108a, is greater than a tape width TW of the magnetic tape 106. Referring to FIG. 10, the height H1 of upper flanges 107, 107 and the height H2 of lower flanges relative the base plate are established.

Referring to FIG. 9, the base plate 103 is also provided with cut-out portion 102 in a front edge thereof For facilitating insertion of a magnetic head (not shown) of a tape drive (not shown) for performing reading and/or writing operations with the magnetic tape 106.

Also, as seen in FIG. 9, a drive mechanism of the tape cartridge 101 is provided. At a forward side of the base plate 103, at a position corresponding to a center of the front edge a drive roller 112 is rotatably mounted. In addition, at rear corners of the base plate 103 proximate a rear edge thereof, first and second (i.e. left and right) corner rollers 113 and 114 are rotatably disposed.

A drive belt 115, made of rubber, plastic, or the like is wound around the drive roller 112 and the first and second corner rollers 113, 114 so as to pressingly contact the surface of the portions of the magnetic tape 106 wound on the reels 109, 110.

According to this construction, when a tape drive (not shown) is engaged with the drive roller 112 so as to turn the drive roller 112, the drive belt 115 is turned along its path between the drive roller 112 and the first and second corner rollers 113, 114 in a manner so as to turn the supply and take-up reels 4 and 5 so as to move the tape therebetween via the first and second tape guide portions 7 and 8, by application of frictional pressure to the outer surface of the tape 106 wound on the supply and take-up reels 109, 110. However, an amount of pressure applied to each reel 109, 110 varies according to an amount of tape wound thereon, an thus the tape guide portions 104, 105 are necessary to stabilize tape motion.

However, according to this structure, when a flange width FW is wider than a tape width TW, problems may arise as set forth below.

First of all, during tape motion, a certain amount of variation of tape position, or 'meandering' in relation to the surface of the tape guide portions 104, 105 is to be expected. If the difference in FW and TW is large, then naturally, according to positional variation of the tape 106 during running, a large degree of offtracking will result.

If such meandering in the width direction occurs during signal recording on the magnetic tape 106, such signal may well prove to be unreadable during playback for retrieving the recorded data.

However, if a dimension of FW is brought close to that of TW, this will not constrain meandering of the tape. Such meandering may have various causes such as irregular motor speed, tape running while the tape drive is being moved, a tape drive capstan (not shown) of the tape drive being misaligned, or other Factors. Thus, if a certain clearance C is not provided in the flange width FW, damage to the tape edges will inevitably occur during operation and tape life and recording quality will both be degraded, and if the clearance C is provided, offtracking will inevitably result.

Thus, it has been required to provide a tape cassette in which a degree of 'offtracking' may be reduced under all operational conditions.

SUMMARY OF THE INVENTION

It is therefore a principal object of the present invention to overcome the drawbacks of the related art.

It is a further object of the present invention to provide a tape cassette in which a degree of 'offtracking ' may be reduced under all operational conditions.

In order to accomplish the aforementioned and other objects, a tape cartridge rotatably mounting first and second reels having a length of tape wound therebetween, the tape being movable along a predetermined tape path according to rotation of the reels is provided. The tape cartridge comprises a cassette casing including a recess for insertion of a head of an apparatus for utilizing the tape, a portion of the tape being normally exposed at the recess; first and second tape guide portions mounted on opposite sides of the recess and active to guide the tape during rotation of the reels so as to establish at least a portion of the predetermined tape path, the first tape guide portion including an upper flange and the second tape guide portion including a lower flange; the first and second tape guide portions being disposed in a manner such that an upper edge of the tape, during motion thereof, contacts an inner surface of the upper flange of the first tape guide portion and a lower edge of the tape contacts an inner surface of the lower flange of the second tape guide portion; and a vertical dimension between the inner surfaces of the upper flange and the lower flange respectively contacted by the upper and lower tape edges is established so as to be substantially equal to or less than that of a width dimension of the tape.

DESCRIPTION OF THE PREFERRED EMBODIMENT

Figure 1:
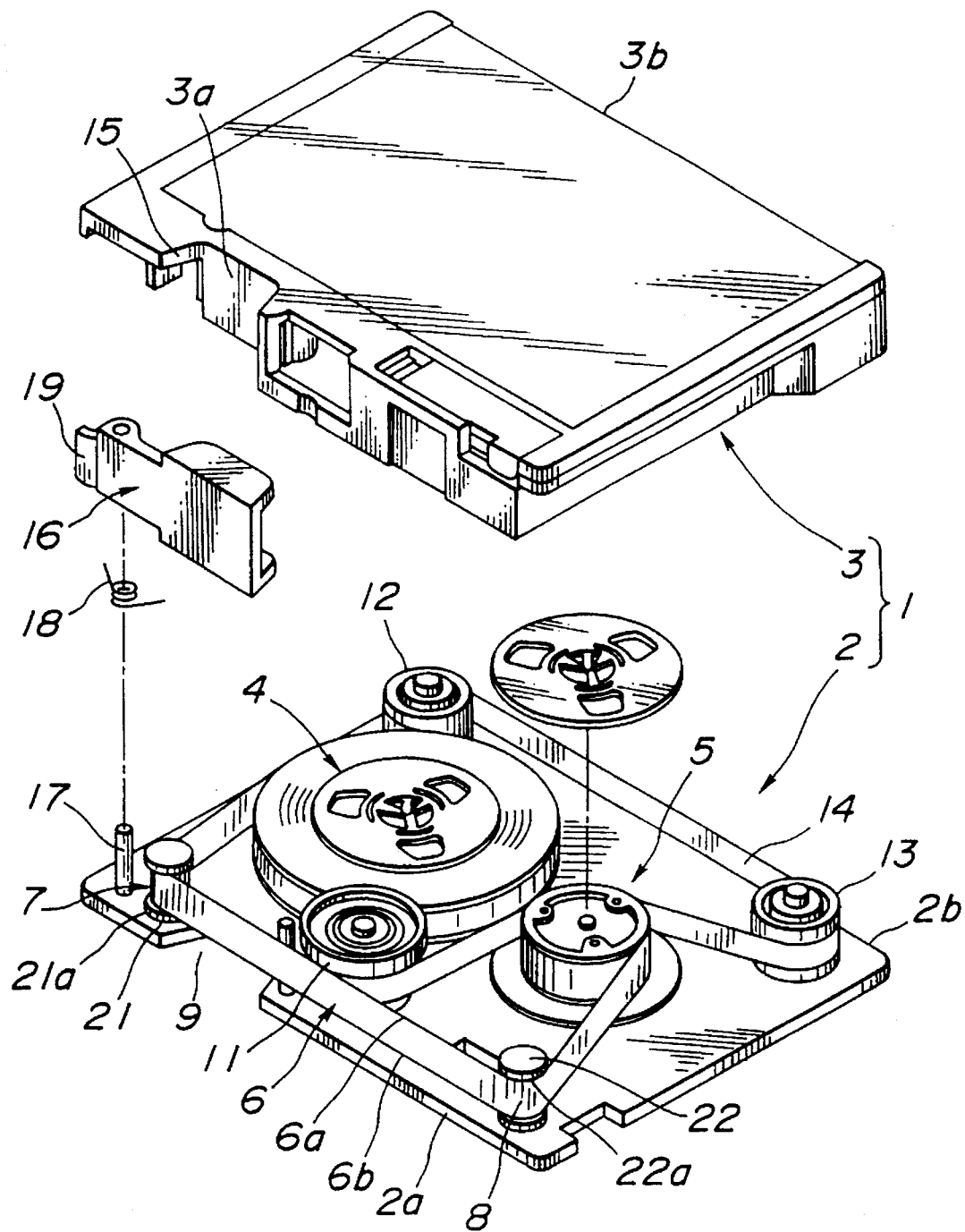
FIG. 1 is an exploded perspective view of a first preferred embodiment of a tape cassette cartridge according to the invention.

Referring now to the drawings, a preferred embodiment of the invention will be described hereinbelow in detail.

As seen in Fig. 1, a data cartridge according to the invention comprises a lower half which also acts as a base plate 2 joined with an upper half 3 via screws or the like. The upper half 3 may be formed on synthetic resin, or the like and preferably may be transparent, semi-transparent, or include transparent portions. Supply and take-up reels 4 and 5 are rotatably mounted on the base plate 2 and magnetic tape 6 is wound therebetween. First and second (i.e. left and right) tape guide portions 7 and 8 are formed in opposing corners of that base plate proximate a front edge 2a thereof such that the magnetic tape 6 is guided so as to run parallel to the front edge 2a, and proximate thereto.

The base plate 2 is also provided with cut-out portion 9 in the front edge 2a thereof for facilitating insertion of a magnetic head (not shown) of a tape drive (not shown) for performing reading and/or writing operations with the magnetic tape 6.

Also, as seen in FIG. 1, at a forward side of the base plate 2, at a position corresponding to a center of the front edge 2a, a drive roller is rotatably mounted. In addition, at rear corners of the base plate 2a, proximate a rear edge 2b thereof, first and second (i. e. left and right) corner rollers 12 and 13 are rotatably disposed.

A drive belt 14, made of rubber, plastic, or the like is wound around the drive roller 11 and the first and second corner rollers 12, 13 so as to pressingly contact the surface of the portions of the magnetic tape 6 wound on the reels 4 and 5.

According to this construction, when a driving mechanism (not shown) of the tape drive (not shown) is engaged with the drive 11 so as to turn the drive roller 11, the drive belt 14 is turned along its path between the drive roller 11 and the first and second corner rollers 12, 13 in a manner so as to turn the supply and take-up reels 4 and 5 so as to move the tape therebetween via the first and second tape guide portions 7 and 8.

Hereinbelow, the structure of the upper half 3 of that data cartridge 1 of the invention will be described in detail.

Similarly to the base plate 2, the upper half 3 includes front and rear sides 3a and 3b. The front side 3a includes an recess 15 corresponding to the cut-out 9 of the base plate 2 for allowing insertion of a magnetic head (not shown). According to this construction, when the base plate 2 is attached to the upper half 3, a portion of the magnetic tape is exposed in the recess 15.

A lid 16 is provided which is disposed over the recess 15 so as to protect the exposed magnetic tape 6. The lid 16 is openably and closably mounted on a shaft 17 projected from the base plate 2 so as to be pivotable on a coil spring 18 and further includes an end member 19 which is pressed for effecting opening of the lid 16, which is biased to return to a closed position thereof by the coil spring 18 when pushing pressure on the end member 19.

Figure 2:
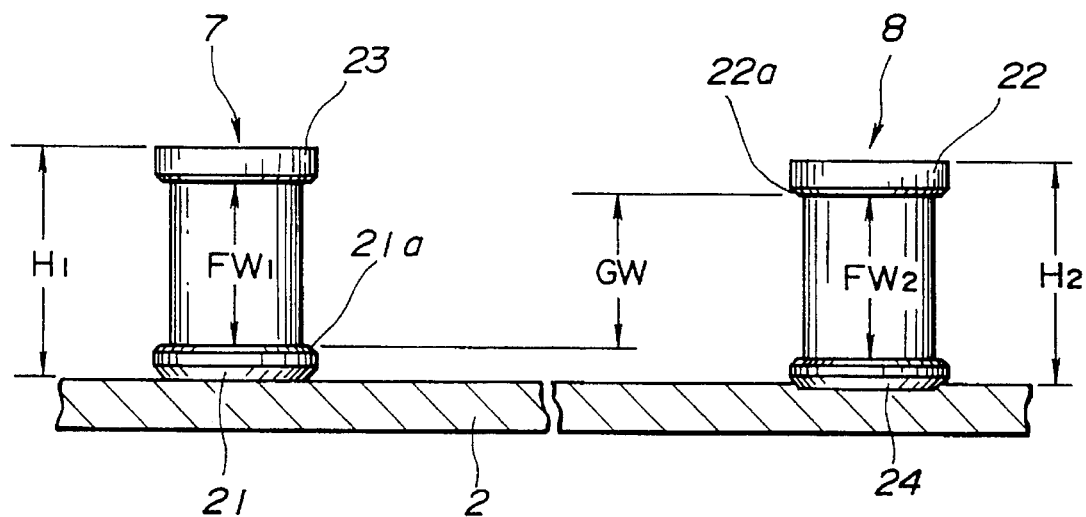
FIG. 2 is a side view showing dimensions of tape guide portions of the tape cartridge of the invention.
Figure 3:
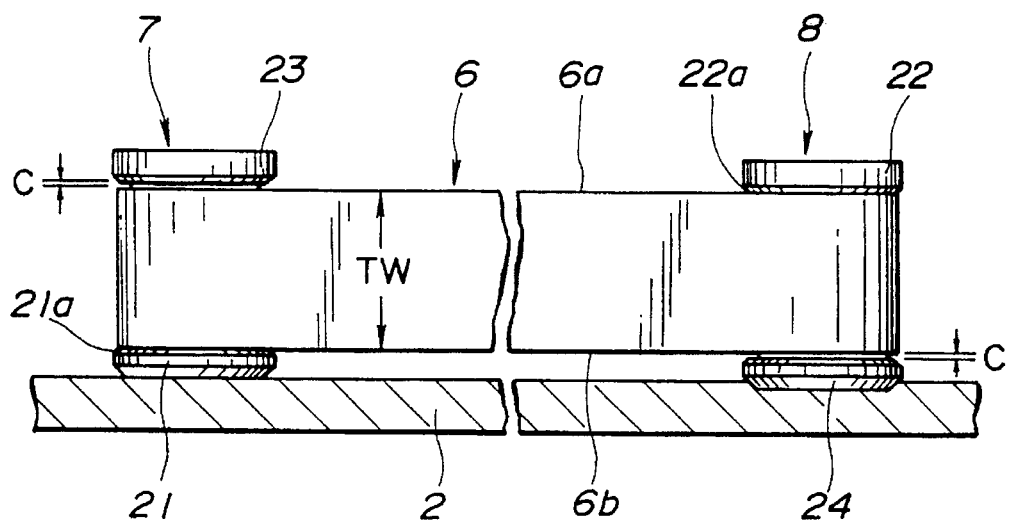
FIG. 3 is a side view showing the dimensions of the tape guide portions of FIG. 2 in relation to a dimension of magnetic tape to be loaded into the cartridge.

Now, important features of the invention relating to the first and second tape guide portions 7, 8 will be described hereinbelow in detail with reference to FIGS. 2 and 3.

As may be seen in the drawings, the tape guide portions 7 and 8 are arranged such that a lower edge 6b of the tape 6 contacts a lower flange 21 of the first tape guide portion 7 and an upper edge 6a of the tape 6 contacts an upper flange 22 of the second tape guide portion 8. The inner sides of the flanges 21, 22 further include positional regulating surfaces 21a, 22a, it is these positional regulating surfaces 21a, 22a which directly contact the tape.

According to this construction, a dimension GW between the positional regulating surface 21a of the lower flange 21 of the first tape guide portion and the positional regulating surface 22a of the upper flange 22 of the second tape guide portion 8 is established to be equal to a dimension TW of the width of the tape 6.

Although the tape is arranged to contact mainly just one flange of each of the tape guide portions 7, 8, the opposing flanges of each guide portions are also utilized. Thus, an upper flange 23 of the first guide portion 7 is established at a dimension FW1 from the lower flange 21 thereof and, similarly, a lower flange 24 of the second guide portion 8 is established at a dimension FW2 from the upper flange 22 thereof. According to the present embodiment, the flange widths FW1 and FW2 are slightly greater than the tape width TW (i.e. by an dimension C, as shown in FIG. 3). Further, according to the preferred embodiment, the flange widths FW1 and FW2 may be identical. In addition, the upper flange 23 of the first tape guide portion 7 and the lower flange 24 of the second tape guide portion 8 may be respectively provided with positional regulating surfaces (not shown) the same as their opposing flanges. Thus, according to the present embodiment, the first and second tape guide portions 7 and 8 may be manufactured to be identical and are thus mutually interchangable. Thus, tooling and manufacture are simplified and costs may be reduced.

Figure 4:
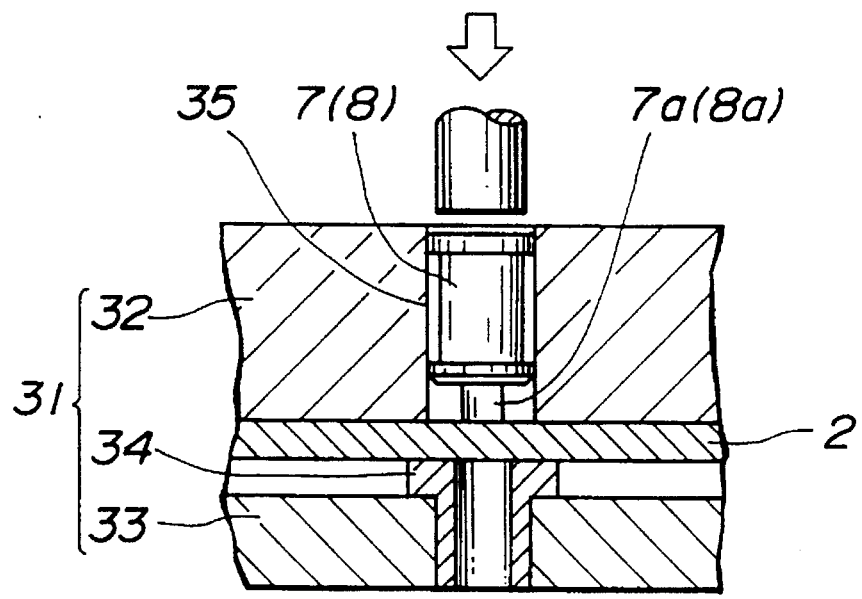
Fig. 4 shows a guide portion of the tape cartridge of the invention before insertion into the cassette case.
Figure 5:
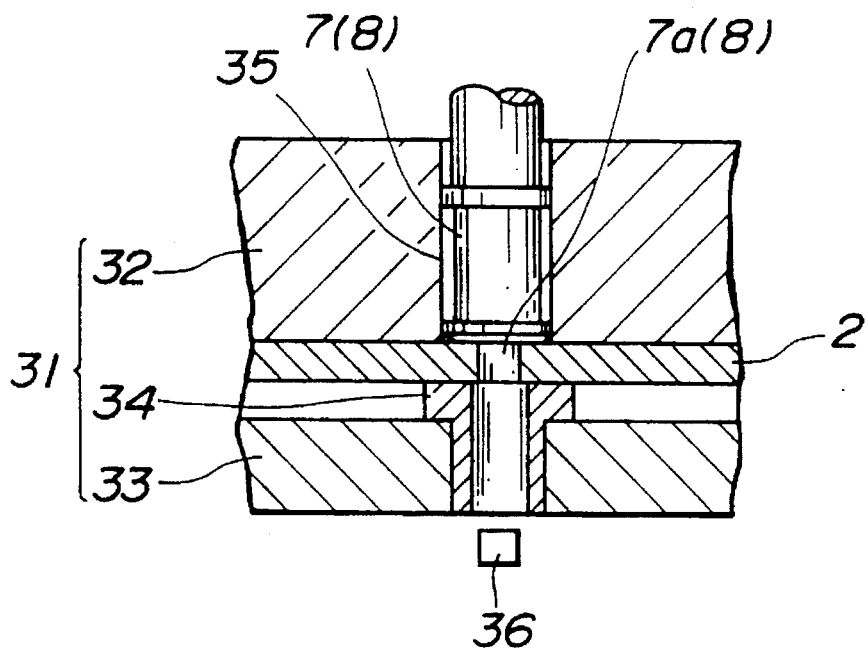
Fig. 5 shows the guide portions of FIG. 4, after insertion into the cassette case.

In order to explain one way in which a tape path in which the upper edge 6a of the tape 6 contacts an upper flange 23, 22 of one tape guide portion 7, 8 and the lower edge 6b of the tape 6 correspondingly contacts a lower flange 21, 24 of the other of the tape guide portions 7, 8, may be established, an installation operation of said guide members 7 and 8 will be described hereinbelow with reference to FIGS. 4 and 5.

First of all, a tape guide implanting mold 31 is utilized, the tape guide implanting mold may be made of metal (eg. steel or the like), and comprises an upper guide mold 32 and a lower mold 33 and positioning shims 34, 34 at lower locations corresponding to the mounting positions of the tape guide portions 7, 8.

The base plate 2 is interposed between the upper and lower guide molds 32 and 33 and the tape guide portions 7 and 8 are inserted into guide holes 35, 35 provided through the upper guide mold 32. According to the present embodiment, the lower sides of the tape guide portions 7, 8 are provided with foot portions 7a, 8a. The positions of the guide holes 35 correspond to positions of the shims 34 such that according to action of a press mechanism 41 (FIG. 6) downward pressure is exerted on the tape guide portions 7, 8 within the guide holes 35 causing the foot portions 7a, 8a thereof to be forcibly 'implanted' in the base plate 2. This implanting of the tape guide portions 7, 8 into the base plate 2 cause a 'punch piece' 36, corresponding to a size of the foot portions 7a, 8a, to be ejected from the base plate 2.

For further explaining a press-punch operation for assembling the data cartridge 1 off the invention, including a step of installation or 'implanting' of the foot portions 7a, 8a reference will be made to FIGS. 6 and 7 in the following description.

As noted above, a press mechanism 41, which may be a hydraulically operated reciprocating device, is utilized for press-punch type installation of the tape guide portions 7, 8. The press mechanism 41 may include an upper press member 42, having a lower plate 43 mounting a set plate 44 on a lower side thereof. The lower side of the set plate 44 is connected to a bush plate 46 via a pair of coil springs 45, 45, the bush plate 46 having holes established therethrough corresponding to the guide holes 35, 35 of the upper mold 32.

First and second cylindrical punch members 47, 48 are mounted at a lower side of the lower plate 43 and firmly held in place by the set plate 44 so as to projected vertically downward from the set plate 44 such that ends thereof are positioned in the holes of the bush plate 46 just over the guide holes 35, 35 of the upper mold 32.

Figure 6:
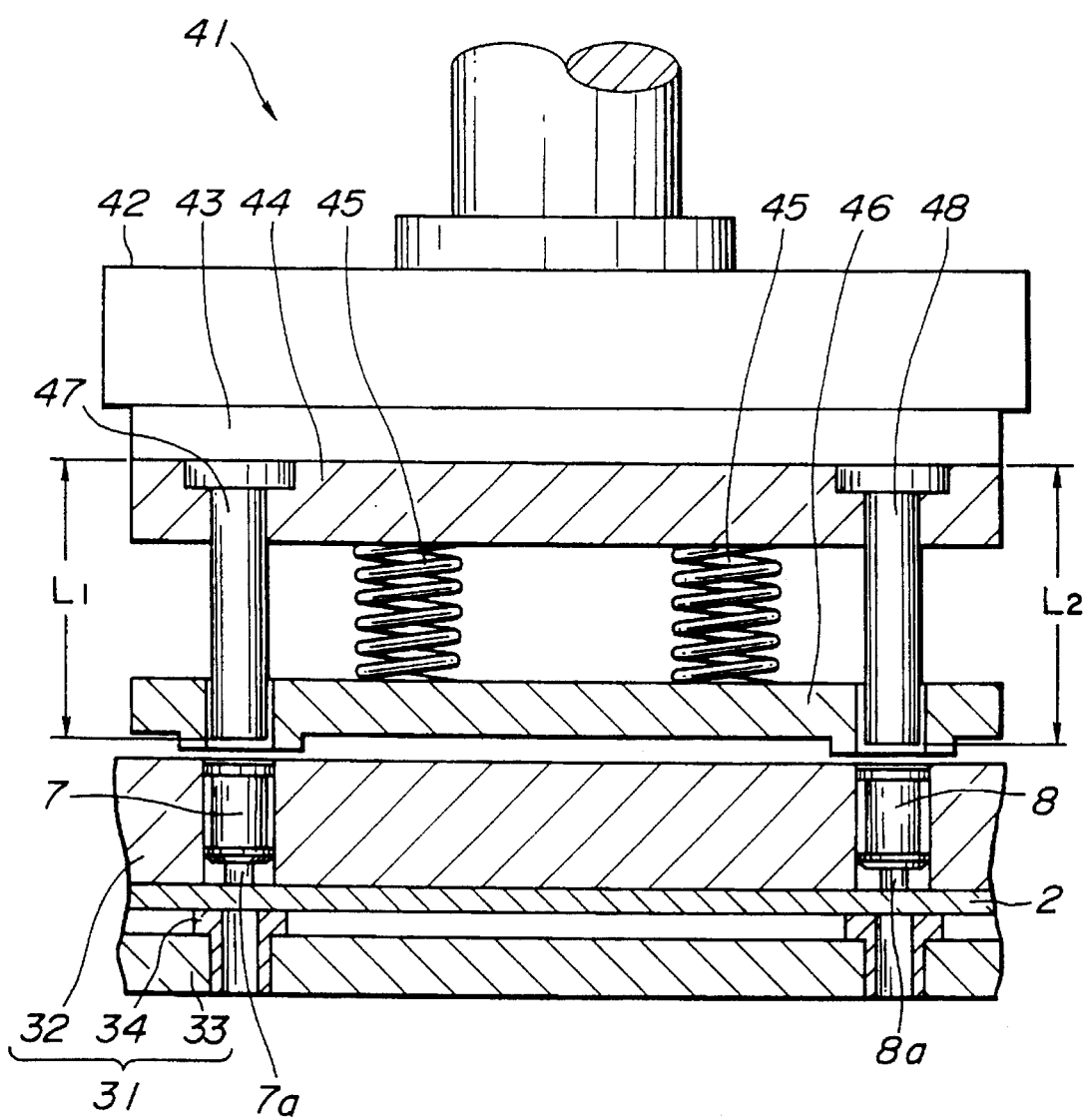
FIG. 6 shows an assembly process for the tape cartridge before a press-punch operation thereof.

Further, as will be noted from FIG. 6, the lengths of the punch members 47, 48 are selected so as to be different from each other. Specifically, the first punch member 47 having a first length L1 and the second punch member 48 having a second length L2 such that punch-pressing operation as shown in FIG. 7 can be carried out.

Figure 7:
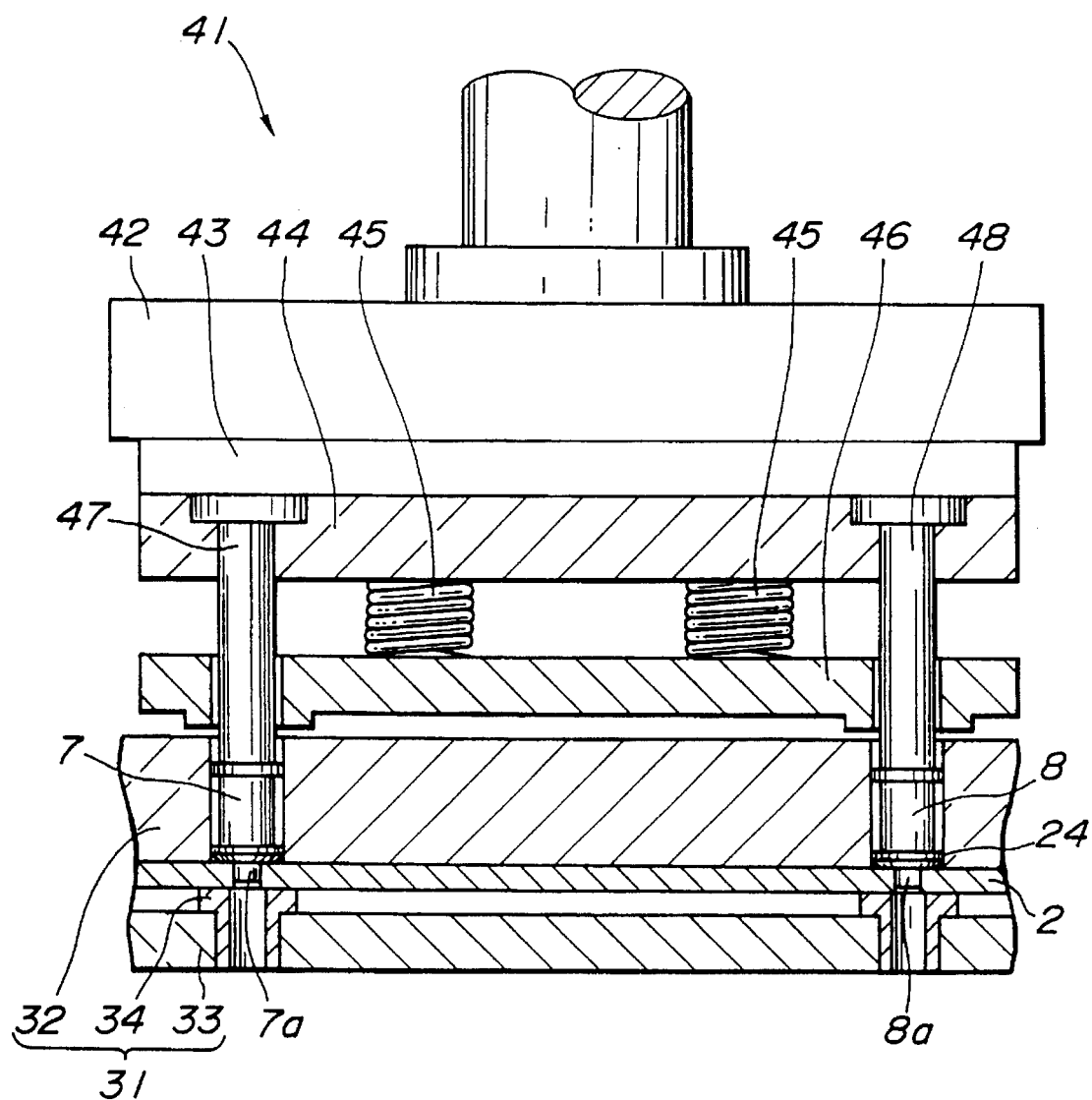
FIG. 7 shows the assembly process for the tape cartridge after the press-punch operation.

As may be seen from FIG. 7, in a press-down condition of the press mechanism, the differing lengths L1 and L2 of the punch members 47, 48 cause the tape guide portions 7 and 8 to be implanted at different depths in the base plate 2 of the data cartridge 1. Specifically, according to the present invention, as seen in FIG. 7, the lower flange 24 of the second tape guide portion 8 is pushed slightly into the material of the base plate 2 ( i.e. aluminum) forming a recess.

When a press up condition, as in FIG. 6 is returned to, the coil springs 46, are active to return the punching elements (43–48) to an initial position for repeating the process with a new base plate 2 and tape guide portions 7 and 8 for effecting mass production of data cartridges 1. According to this operation, a tape path according to the invention may be established in which an upper edge 6a of the tape 6 may contacts an upper flange of one tape guide portion 7, 8 and a lower edge 6b of the tape 6 may correspondingly contacts a lower flange of the other of the tape guide portions 7, 8.

According to the above process, and suitable control of punching pressure, lengths L1 and L2 of the punch members 47, 48 as selection of materials for the base plate 2 and the tape guide portions 7, 8, punch-press installation of the tape guide portions 7, 8 may be suitably controlled so as to precisely provide the guide width GW which precisely corresponds to the tape width TW of the magnetic tape 6.

Figure 8:
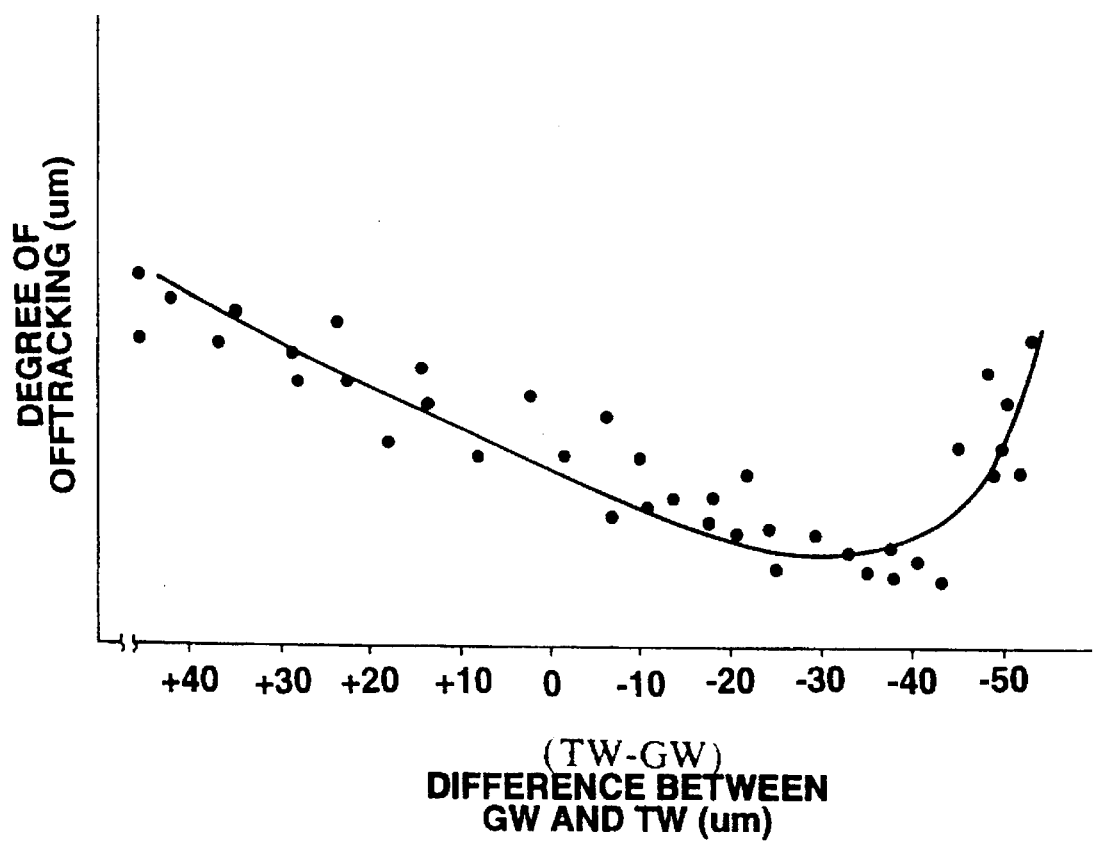
FIG. 8 is a graph representing a difference between a guide width GW of tape guide portions and a tape width TW (in microns μ) in relation to a degree of offtracking of magnetic tape in a tape cartridge.
Figure 9:
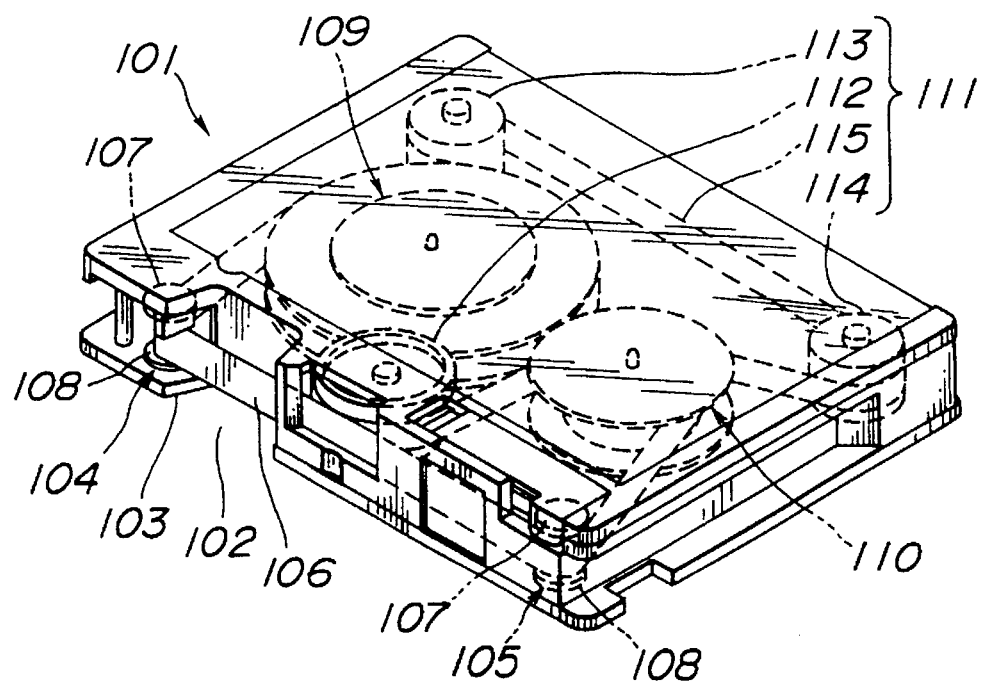
FIG. 9 is a perspective view of a conventional magnetic tape cassette structure commonly utilized for tape data cartridges.
Figure 10:
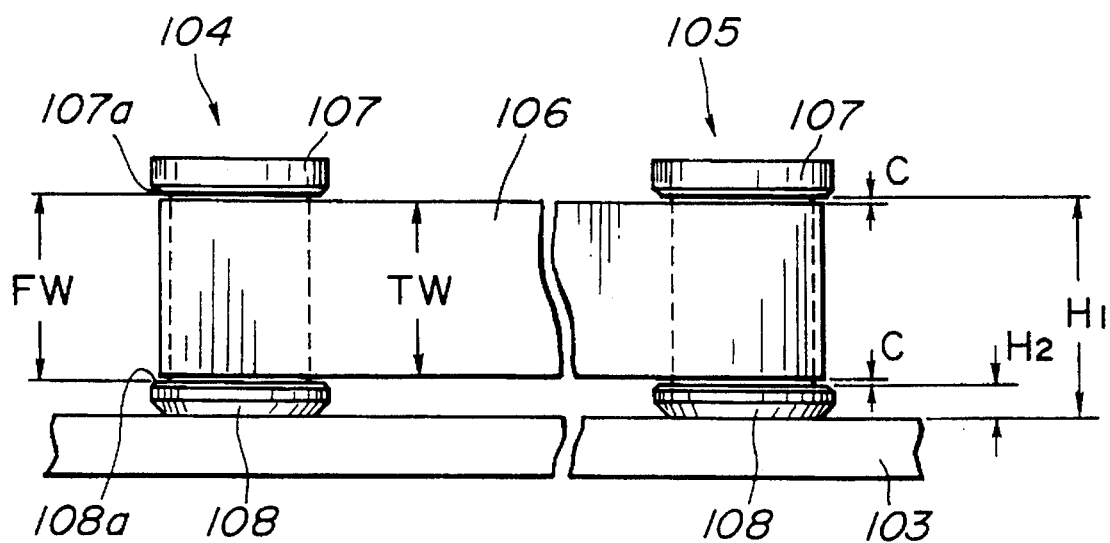
FIG. 10 is a side view of the conventional tape cartridge of FIG. 9 showing a relation between a tape width TW of magnetic tape and a flange width FW of tape guide portions of the cartridge.

Referring now to FIG. 8, a graph reflecting results of testing carried out by the present inventors is shown which illustrates the relation between differences in the guide width GW and the tape width TW as they affect occurrence of offtracking. As may be appreciated, the closer the dimension GW is to that of TW, the fewer the occurrences of offtracking. Specifically, difference within a range of 0 to $-40\mu m$ as shown in FIG. 8 shows the lowest incidence of offtracking. That is, if the dimension GW is slightly smaller than the tape width TW, offtracking may be favorably reduced.

Also, since according to the invention the flange width FW is not relied upon for establishing the guide width GW, a slight clearance C may be provided at each flange for absorbing irregularities of tape motion (i.e. 'meandering') which would otherwise cause edge damage to the tape 6. Thus, if motor speed is irregular, the tape is running while the tape drive is being moved, a tape drive capstan (not shown) of the tape drive is misaligned, or other factors cause irregularity in tape motion, this may be compensated by the flange width while the guide width GW may be controlled in close torerance with the tape width It will further be noted that other processes may be employed for establishing the relative positions of the first and second tape guide portions 7 and 8 than that shown in FIGS. 4–7. For example, first and second recesses may be formed for receiving lower sides of each of the tape guide portions 7, 8, each of the recesses having a different depth. The tape guide portions may be mounted in each recess via adhesive or the like.

In addition, although the above-described preferred embodiment is drawn to a data cartridge for tape drives utilized for computer equipment, the cartridge structure of the invention may be used to reduce offtracking in all manner of cassette tape applications including audio cassettes, digital data cassettes, printer cartridges etc.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A tape cartridge having an upper portion and a base plate, said base plate rotatably mounting first and second reels which have a length of tape wound therebetween, said tape being movable along a predetermined tape path according to rotation of said reels, said cartridge comprising:

a cassette casing including a first recess for insertion of a tape head, a portion of said tape being normally exposed at said first recess;

first and second substantially identical tape guide portions mounted on opposite sides of said first recess to guide said tape during rotation of said reels and to establish at least a portion of said predetermined tape path, said first tape guide portion including an upper flange and a lower flange, said second tape guide portion including an upper flange and a lower flange, the vertical dimension between the upper and lower flanges of said first and second tape guide portions being slightly greater than a width dimension of said tape; and second and third recesses formed in the base plate for receiving the lower sides of each of the first and second guide portions, respectively, said second and third recesses differing in depth so that the first and second guide portions are mounted at different heights on said base plate of the cartridge, so that said first and second tape guide portions are disposed in a manner such that an upper edge of said tape, during motion thereof, contacts a first positional regulating surface on a lower surface of said upper flange of said first tape guide portion, and a lower edge of said tape contacts a second positional regulating surface on an upper surface of said lower flange of said second tape guide portion, and so that a vertical dimension between said first and second positional regulating surfaces is substantially equal to or less than that of said width dimension of said tape.

2. A tape cartridge as set forth in claim 1, wherein said recess receives a magnetic head of a data tape drive for reading and writing information data to and from said tape, wherein said tape is a magnetic medium.

3. A-tape cartridge as in claim 1, wherein said vertical dimension between said first and second positional regulating surfaces respectively contacted by said upper and lower tape edges is established to be between 1 µm to 40 µm less than said tape width.

4. A tape cartridge as set forth in claim 1, wherein said first and second tape guide portions are provided with foot portions at a lower side thereof and are mounted on said base plate via pressing such that said foot portions punch respective holes in said base plate, said foot portions thus being anchored in the holes as a result of said pressing.

5. A tape cartridge as set forth in claim 1, wherein said base plate is formed of aluminum.

6. A tape cartridge as set forth in claim 1, wherein said tape is magnetic tape.

* * * * *